US006748540B1

(12) United States Patent
Canestaro et al.

(10) Patent No.: US 6,748,540 B1
(45) Date of Patent: Jun. 8, 2004

(54) METHOD AND APPARATUS FOR DETECTION AND NOTIFICATION OF UNAUTHORIZED ACCESS ATTEMPTS IN A DISTRIBUTED DATA PROCESSING SYSTEM

(75) Inventors: Christopher Lawrence Canestaro, Austin, TX (US); Rick A. Hamilton, II, Austin, TX (US); John Steven Langford, Austin, TX (US); Maulin Ishwarbhai Patel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,291

(22) Filed: Jun. 17, 1999

(51) Int. Cl.[7] .......................... G06F 11/30; G06F 12/14; H04L 9/32
(52) U.S. Cl. ...................... 713/201; 713/194; 709/224; 709/225
(58) Field of Search ................................ 713/194, 200, 713/201; 709/224, 225; 707/9

(56) References Cited

U.S. PATENT DOCUMENTS

| 4,719,566 A | 1/1988 | Kelley ...................... 364/200 |
| 5,491,820 A | 2/1996 | Belove et al. .............. 395/600 |
| 6,405,318 B1 * | 6/2002 | Rowland .................... 713/200 |
| 6,460,141 B1 * | 10/2002 | Olden ........................ 713/201 |

FOREIGN PATENT DOCUMENTS

JP    10240687 A  *  9/1998  ........... G06F/15/00

OTHER PUBLICATIONS

Syntrex Inc., "Syntrex Inc. Introduces Remote Access Facility, a Package That Allows Access to Information Stored on a Syntrex File Server," Jul. 15, 1986, PR Newswire. Dialog Corporation, Cary, NC, USA, Accession No. 04305780.*
Y. Okuni, JP 10–240687 A, "Network System," Sep. 11, 1998, Japan Patent Office, Computer Translation into English. Retrieved from the Internet:<URL: http://www.ip-dl.jpo.go.jp/homepg_e.ipdl>.*

* cited by examiner

Primary Examiner—Justin T. Darrow
(74) Attorney, Agent, or Firm—Duke W. Yee; David A. Mims, Jr.; Richard J. Moura

(57) ABSTRACT

A method and apparatus for identifying unauthorized attempts to access a data processing system. A file used to contain data on failed attempts to access the data processing system is monitored. Responsive to the file containing data on failed attempts to access the data processing system, the data is analyzed to identify candidates for unauthorized access attempts.

39 Claims, 9 Drawing Sheets

```
#!/bin/ksh
######################################################################
#watchdog.ksh               John Langford & Rick Hamilton
#Version 2.0
#02/24/99                   Copyright, 1999 by the IBM Corporation

# This script, watchdog.ksh, is designed to watch for patterns among
# failed login attempts, and to report to an administrative user if these
# patterns are matched. In summary, if login failures occur for a
# given user id from a host where a successful login has NEVER occurred
# for this particular id, then a possible intrusion is flagged. It
# is generally executed as root, preferably from crontab, with the
# desired flags (see usage below).
######################################################################
# Version history:
# V1.0 Initial version 01/16/99
# V2.0 Cleaned up text, added additional flag for command line. 02/24/99
######################################################################
function USAGE {
  print "Usage: watchdog.ksh [-v] [-u username] [-f filename] [-e email_addr]"
  print "  -v:        Verbose."
  print "  -u username:  The name of a user to monitor."
  print "  -f filename:  The name of a file which contains the"
  print "                user names, one per line, to monitor."
  print "  -e email_addr: Where the notices are sent."

exit1
}
```

```
###########################################################
# save the command line for later
###########################################################

CMDLINE=$*
VERBOSE="false"
FAILEDLOGIN="/etc/security/failedlogin"
FAILEDLOGINSAVE="/etc/security/failedlogin.save"
TMPFAILEDLOGIN="/etc/security/failedlogin_$$"
TEMP_FAILED="/tmp/watchdog4_$$"
WTMP="/usr/adm/wtmp"
TEMPWTMP="/tmp/watchdog1_$$"
MAILFILE="/tmp/watchdog2_$$"
USERFILE="/tmp/watchdog3_$$"
EMAILADDR="root@$(hostname)"

rm-f${USERFILE}
touch${USERFILE}
rm-f${MAILFILE}
touch${MAILFILE}
###########################################################
# parse the command line arguments
###########################################################
while getopts":vu:f:e:"OPT;
do
  case${OPT}in
  v)VERBOSE="true" ;;
  u)print${OPTARG}>>${USERFILE};;
  f)cat${OPTARG}>>${USERFILE};;
  e)EMAILADDR=${OPTARG};;
  *)USAGE;;
\?)USAGE;;
  esac
done shift$(($OPTIND-1))
if[[$#!=0]];
then
  USAGE
fi
```

FIG. 7C

```
########################################################################
# If there haven't been any failed login attempts, then exit immediately
################################################################## if[[!-s"${FAILEDLOGIN}"]];
then
  exit0
fi
```
⎫
⎬ 708
⎭

```
########################################################################
# work with a copy of /etc/security/failedlogin!
########################################################################
cat${FAILEDLOGIN}>>${FAILEDLOGINSAVE}
mv${FAILEDLOGIN}${TMPFAILEDLOGIN}
touch${FAILEDLOGIN}
```
⎫
⎬ 710
⎭

```
########################################################################
# Sort and unique the successful login entries:
########################################################################
# TEMPWTMP is the newly stripped wtmp file
########################################################################
rm-f${TEMPWTMP}
who-q${WTMP} | {
while read name host;
do
Throw away records that have no hostname and also toss
the "Total" line at the end.
  if[[-z"${host}" || "${name}"="Total"]];
  then
    continue
  fi
  host=${host#?}
  host=${host%?}
  print${name}${host}>>${TEMPWTMP}
done
}
sort-u${TEMPWTMP}-o${TEMPWTMP}
```
⎫
⎬ 712
⎭

FIG. 7D

```
################################################################
# Sort and unique the failed login entries:
################################################################
# TEMP_FAILED is the newly stripped file of failed logins
################################################################
rm -f ${TEMP_FAILED}
touch ${TEMP_FAILED}
who -q ${TMPFAILEDLOGIN} | {
while read name host;
do
Throw away records that have no hostname and also toss
the "Total" line at the end.
  if [[ -z "${host}" || "${name}"="Total" ]];
  then
    continue
  fi
  host=${host#?}
  host=${host%?}
  print ${name} ${host} >> ${TEMP_FAILED}
done
}
sort -u ${TEMP_FAILED} -o ${TEMP_FAILED} cat ${TEMP_FAILED} | {
while read name host;
do
  if [[ -s "${USERFILE}" ]];
  then
    grep ${name} ${USERFILE} 2>&1 >/dev/null
    if [[ $?!=0 ]];
    then
      continue
    fi
  fi
  grep ${host} ${TEMPWTMP} 2>&1 >/dev/null
  if [[ $?=0 ]];
  then
    print " "${name}"@"${host} >> ${MAILFILE}
  fi
done
}
```

```
#########################################################################
# If the mail file is not empty, then send an email notification
#########################################################################
if[[-s${MAILFILE}]];
then
 TMPFILE=/tmp/fsmon_temp_$$
 rm-f${TMPFILE}
 if[[${VERBOSE}="true"]];
 then
  print"This note was generated automatically by \"watchdog\".">${TMPFILE}
  print"   date:    $(date)">>${TMPFILE}
  print"   machine: $(hostname)">>${TMPFILE}
  print"watchdog ${CMDLINE}">>${TMPFILE}
  print>>${TMPFILE}
  print"The following failed login attempts have been made:">>${TMPFILE}
 fi
 cat${MAILFILE}>>${TMPFILE}
 mail-s"watchdog found something interesting!"${EMAILADDR}<${TMPFILE}
fi
#########################################################################
# Finished. Perform cleanup of temporary files.
#########################################################################
rm-f${MAILFILE}
rm-f${TMPFILE}
rm-f${TMPFAILEDLOGIN}
rm-f${TEMP_FAILED}
rm-f${TEMPWTMP}
rm-f${USERFILE}
```

METHOD AND APPARATUS FOR DETECTION AND NOTIFICATION OF UNAUTHORIZED ACCESS ATTEMPTS IN A DISTRIBUTED DATA PROCESSING SYSTEM

BACKGROUND OF THE INVENTION

1. Technical Field

The present invention relates generally to an improved distributed data processing system and in particular to a method and apparatus for managing a distributed data processing system. Still more particularly, the present invention provides a method and apparatus for detection and notification of unauthorized attempts to login to a network.

2. Description of Related Art

In network computer systems, a plurality of client computers are typically connected together, and to one or more server computers in the network. A network may be established through the hardwired interconnection of a plurality of clients and servers in a local network, or on a World Wide Web, which may include telecommunication links. In any case, the clients and servers may act as central control units for providing access to files, programs, and program execution to the individual computers connected within the network.

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web.

With the rise of the Internet and electronic commerce, one problem facing information system departments is how to detect a successful or attempted incursion or access to their computers. In the present dynamic system environment, a conscientious organization must be on guard against unauthorized access to their computer systems. Despite organizational commitments to security, administrators are often too busy to perform the checks needed to monitor and identify failed attempts to access a computer system. Most administrators spend large amounts of time responding to end user crises. Remaining amounts of time are dedicated to system maintenance. As a result, despite the public positions and money spent on security by an organization, at a practical level, administrators have little time to deal with such issues until an intruder has caused damage to the computer system.

Therefore, it would be advantageous to have an improved method and apparatus for monitoring for unauthorized access to a computer system and for notification of such unauthorized access.

SUMMARY OF THE INVENTION

The present invention provides a method and apparatus for identifying unauthorized attempts to access a data processing system. A file used to contain data on failed attempts to access the data processing system is monitored. Responsive to the file containing data on failed attempts to access the data processing system, the data is analyzed to identify candidates for unauthorized access attempts.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7D are diagrams illustrating a script implementing the processes of the present invention depicted in accordance with a preferred embodiment of the present invention.

DETAILED DESCRIPTION OF THE PREFERRED EMBODIMENT

Figure 1:
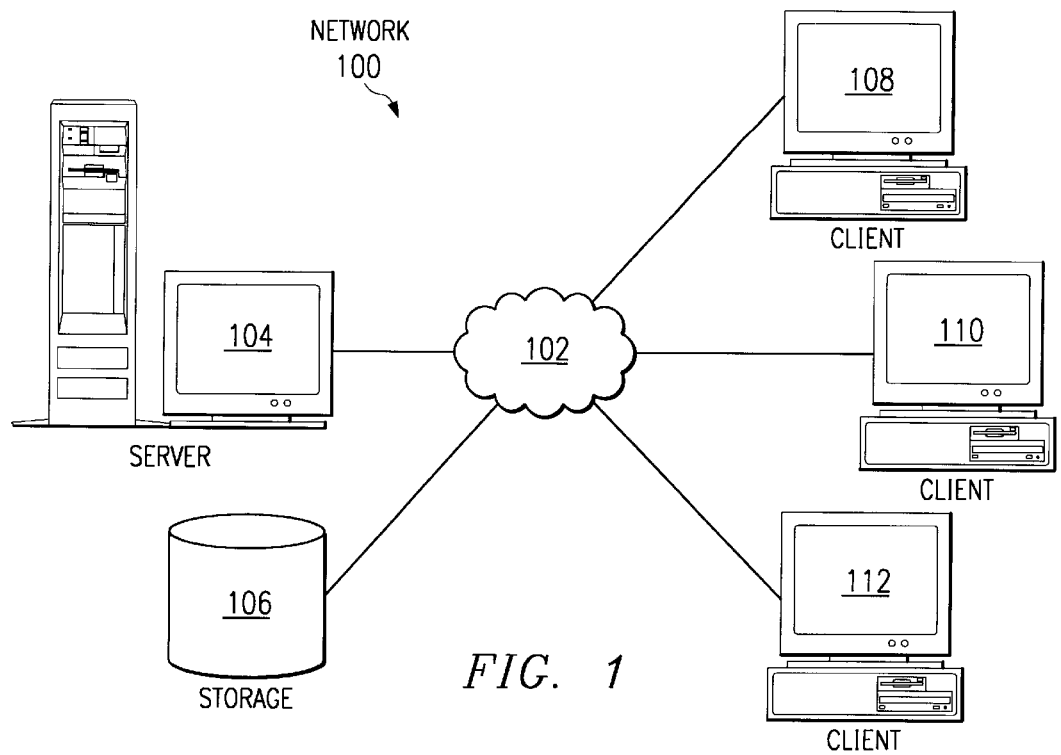
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. The processes of the present invention may be used to detect unauthorized access to a server such as server 104.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
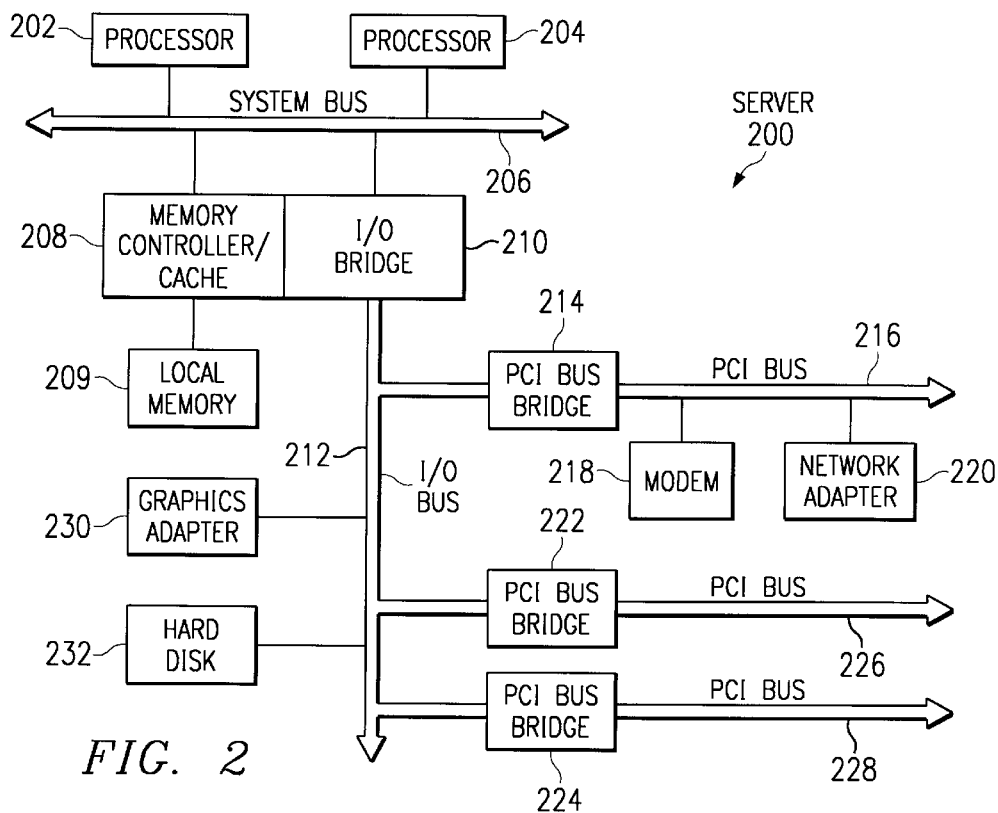
FIG. 2 is a block diagram depicting a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system. Alternatively, server 200 may employ and operating system such as LINUX.

Figure 3:
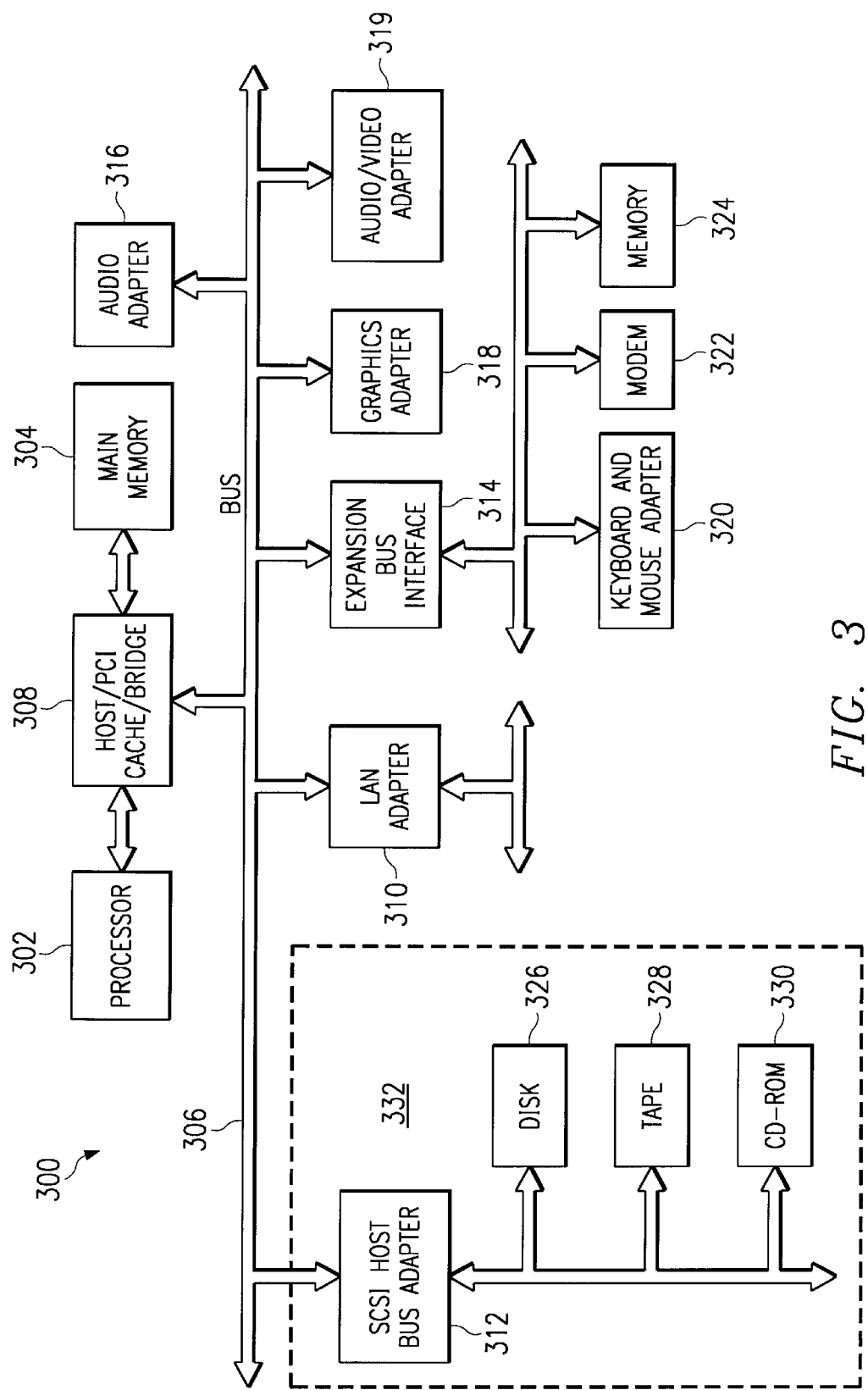
FIG. 3 is a block diagram illustrates a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA)

device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and instructions for detection and notification of unauthorized access attempts to a computer. This monitoring and notification may be applied to a server, such as server 200 in FIG. 2 or a client such as data processing system 300 in FIG. 3. In the depicted examples, the description of the present invention is described with respects to implementation in a UNIX based system. Of course, the processes of the present invention may be applied to any number of types of operating systems.

The mechanism of the present invention runs a script via a computer's crontab. Crontab is a standard UNIX utility to execute programs on a periodic basis and is fully configurable by the administrator (i.e. which jobs get executed when).

The present invention takes advantage of a file that is present in UNIX systems used to track login failures. This file is typically not reviewed by administrators because such a review is usually low on the priority list. Further, the record is not in a user friendly format. The processes implemented in a script may be automatically run to analyze the file and send a notification in response to an identification of candidates for unauthorized logins.

Some of the premises regarding illicit intrusions include the following. First, most successful intrusions to a computer follow some number of failed attempts. An example of this would be the execution of a password guessing routine against a computer in which many passwords are tried prior to finding the correct one. Second, most intrusions come from originating hosts, which have not been previously used for access to a given computer. An example of this is a user within, or outside of, an organization who attempts to logon to a given system as root from some remote system, for which root logons typically occur from either a local console or another preset machine.

Figures 4, 6:
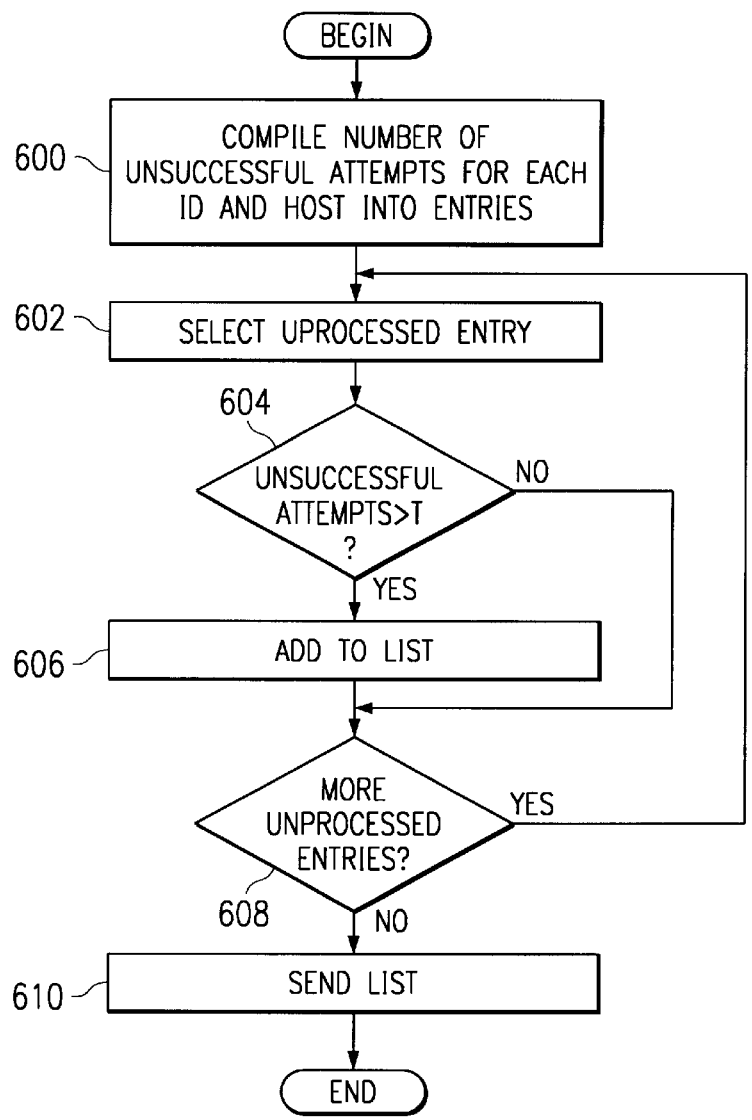
FIG. 4 is a diagram illustrating entries in a file used to track failed access attempts to a data processing system depicted in accordance with a preferred embodiment of the present invention.
FIG. 6 is a flowchart of an alternate process to identify candidates for unauthorized attempts depicted in accordance with a preferred embodiment of the present invention.

With reference now to FIG. 4, a diagram illustrating entries in a file used to track failed and successful access attempts to a data processing system is depicted in accordance with a preferred embodiment of the present invention. File 400 includes a number of entries for tracking failed access attempts to a computer. Such a file may be generated by recording data each time an access attempt has failed. In this example, entries 402–408 each include an identification of the originating host and the user ID sent from the originating host in the failed access attempt. If no failed access attempts have occurred, this file will have a length of zero. Other fields, not shown, may be present in file 400. The files are put into a human readable form in this example with a "who -q" UNIX command.

Figure 5:
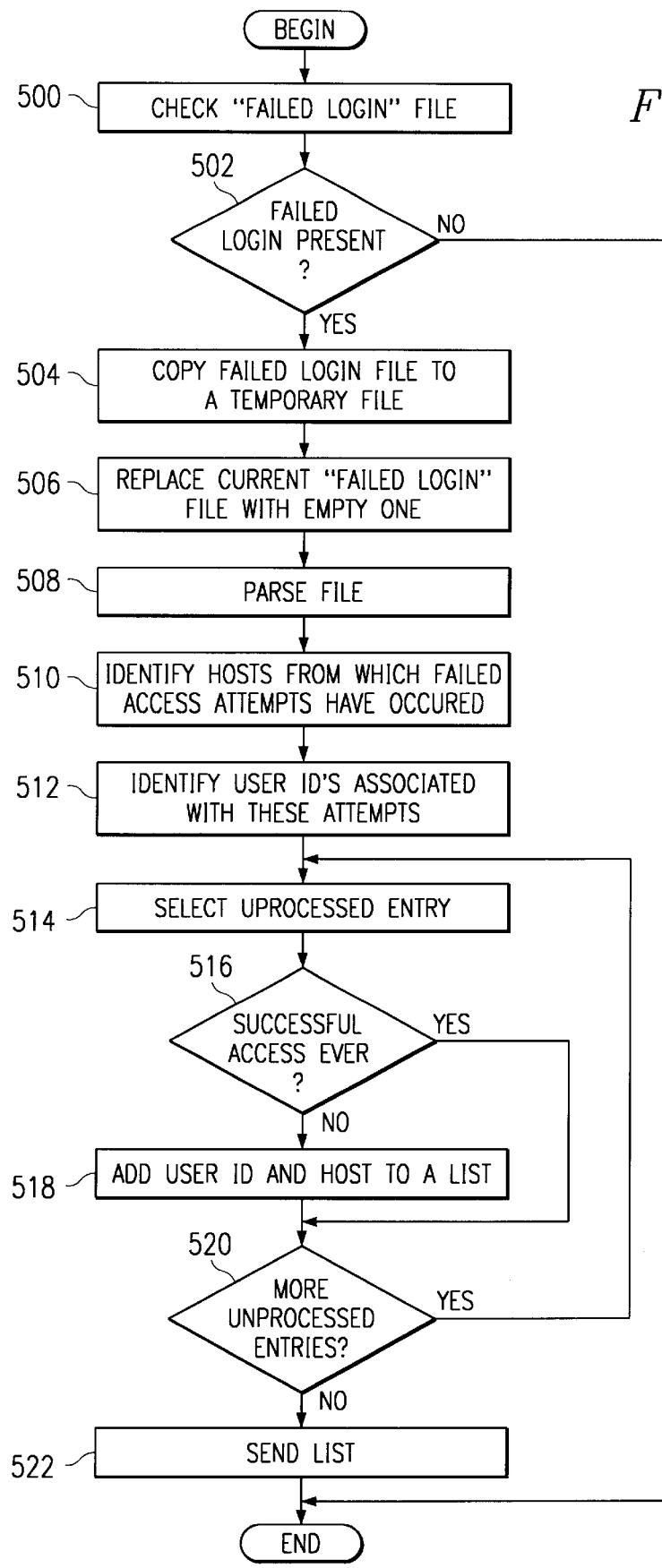
FIG. 5 is a flowchart of a process for detection and notification of unauthorized access attempts depicted in accordance with a preferred embodiment of the present invention.

With reference now to FIG. 5, a flowchart of a process for detection and notification of unauthorized access attempts is depicted in accordance with a preferred embodiment of the present invention. In this example, the processes are describe with reference to steps used in a UNIX system.

The process begins by checking the "failed login" file containing records of failed access attempts (step 500). A determination is made as to whether failed access attempts are present (step 502). One way to make this determination is to check the length of the file. If the file is a zero length file, then no failed logins have been recorded. Alternatively, the file may be opened to see if any records or entries are present. If no records or entries are present then no failed access attempts have occurred. If this is the case, the process terminates.

Otherwise, the "failed login" file is copied to a temporary file (step 504). The copy is made for processing to identify candidates for unauthorized access attempts. The current "failed login" file is replaced with an empty one (step 506). The replacement provides a base line for the next time the process is executed. The file is parsed (step 508). From parsing of the file, hosts are identified from which failed access attempts have occurred (step 510). The user IDs associated with these attempts are identified (step 512). An unprocessed entry is selected (step 514).

The information from the "failed login" file is compared with a file containing a list of valid attempts to access the data processing system. This comparison is described as follows. A determination is made as to whether a successful access or login has ever occurred from this particular host for the user ID in the entry (step 516). If a successful access has not ever occurred, the host and the user ID are added to the list (step 518). Thereafter, a determination is made as to whether additional unprocessed entries are present (step 520). If additional unprocessed entries are present, the process returns to step 514. Otherwise, the list of the candidates identified are sent (step 522) with the process terminating thereafter. This list is usually sent to an administrator or other IS staff and may be directed through an e-mail address.

With reference again to step 516, if a successful access has occurred from the host for the user id, the process proceeds to step 520.

The processes are implemented as a script that is generally run once each day or as frequently as desired. For example, a frequency execution of 10 minutes would provide near "real time" feedback to an administrator if an illicit incursion is underway through continued receipt of notifications.

With reference now to FIG. 6, a flowchart of an alternate process to identify candidates for unauthorized attempts is depicted in accordance with a preferred embodiment of the present invention. This comparison is an example of another comparison that may be used to detect unauthorized access to a data processing system. Of course, other comparison logic may be used depending on the implementation. The steps described in FIG. 6 may be used in place of steps 512–522 in FIG. 5.

The process begins by compiling the number of unsuccessful attempts for each host and user ID (step 600). Step 600 would generate an entry for each user ID and the host from which an unsuccessful attempt has occurred. The entry also would include the number of unsuccessful attempts from that user ID and host pair. Next, an unprocessed entry is selected for analysis (step 602). A determination is made as to whether the number of unsuccessful attempts for the selected host is greater than a threshold T (step 604). T may be any number of attempts depending on the implementation. If the number of unsuccessful attempts is greater than the threshold T, then the host and user IDs associated with the host are added to a list (step 606). A determination is made as to whether additional unprocessed entries are present for analysis (step 608). If additional unprocessed entries are present, the process returns to step 602.

Otherwise, the list is sent in this example to an administrator identified by an e-mail address (step 610) with the process terminating thereafter.

With reference now to FIGS. 7A–7D, a diagram illustrating a script implementing the processes of the present invention is depicted in accordance with a preferred embodiment of the present invention. Script 700 is for use in a UNIX based data processing system and watches for patterns among failed login attempts and reports to an administrative user if the patterns are matched. In this example, if login failures occur for a given user ID from a host in which a successful login has never occurred from this particular id, the ID is flagged or identified as a candidate for a possible unauthorized access attempt.

Section 702 in FIG. 7A in script 700 includes the usage as used to initiate its execution. In this section, the syntax for the command line to run script 700 is "watchdog -v -u <userid> -e <emailaddress> -f <filename of userid's to monitor failed logins>". For this syntax, "-v" indicates verbose mode, providing the maximum amount of information to the user; "-u <userid>" indicates what userid's are subject to monitoring. If started without this flag, script 700 monitors all user IDs on the system. "-e <emailaddress>" is the email address which will receive the notification. If started without this flag, script 700 will mail notification to root@ 'hostname' However, given that root is the most likely ID to be intruded, an administrator may want to set this up to mail to a lower-profile user ID, or to an ID on another system. Using the "-f <filename of user IDs to monitor>" syntax is useful if the administrator wants to monitor more than one userid but not all user IDs.

In section 704, the command line information is saved for later use. In FIG. 7B, section 706 in script 700 parses the command line arguments. Next, section 708 in script 700 causes an exit to occur if no failed logon attempts are present. Section 710 contains instructions to use the copy of the failed login file for processing. Section 712 contains instructions to process successful login entries while section 714 in FIG. 7C is used to process failed login entries. In FIG. 7D, section 716 in script 700 contains instructions to create and send an e-mail notification. Section 718 contains instructions to clean up temporary files.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the processes of the present invention in the depicted example are illustrated as being implemented in script for a UNIX system. These processes may be implemented in other systems other than UNIX, for example, Windows NT or LINUX. Further, the processes may be implemented using instructions other than script. Furthermore, the processes of the present invention could be implemented remotely from the data processing system from which unauthorized access is being monitored. For example, the processes of the present invention may gather login files from different servers or other computers for analysis at an administrator's computer. The embodiment was chosen and described in order to best explain the principles of the invention the practical application and to enable others of ordinary skill in the art to understand the invention for various embodiments with various modifications as are suited to the particular use contemplated.

What is claimed is:

1. A method for identifying unauthorized attempts to access a data processing system, the method comprising the computer implemented steps of:

recording data in a file each time an attempt to access the data processing system has failed;

monitoring said file used to contain said data on failed attempts to access the data processing system; and responsive to said file containing said data on failed attempts to access the data processing system, analyzing said data to identify candidates for unauthorized access attempts.

2. The method of claim 1 further comprising: generating a list of candidates of unauthorized access attempts; and sending the list to a destination.

3. The method of claim 2, wherein the destination is identified in an email address.

4. The method of claim 2, wherein the destination is a data processing system for an information systems administrator.

5. The method of claim 1, wherein the step of analyzing the data to identify candidates for unauthorized access attempts comprises:

identifying hosts from which failed access attempts occurred;

identifying user identifications for the failed access attempts;

determining whether a successful access attempts have occurred for the user identifications for the hosts; and responsive to an absence of a successful access attempt for a user identification from a host, placing the host in a list.

6. The method of claim 1, wherein the step of analyzing the data to identify candidates for unauthorized access attempts comprises:

identifying user identifications (user IDs) for the failed access attempts;

identifying a number of failed access attempts for each user ID;

determining, for each user ID, whether a number of failed access attempts for a user ID is greater than a threshold; and responsive to the number being greater than the threshold, placing the user ID in a list.

7. The method of claim 1, wherein the step of monitoring occurs in response to an event.

8. The method of claim 1, wherein the method is performed in the data processing system.

9. The method of claim 1, wherein the method is performed at another data processing system remote to the data processing system.

10. A method for identifying unauthorized attempts to access a data processing system, the method comprising the computer implemented steps of:

responsive to a periodic event, monitoring a file used to contain data on failed attempts to access the data processing system; and responsive to the file containing data on failed attempts to access the data processing system, analyzing the data to identify candidates for unauthorized access attempts.

11. A method for identifying unauthorized attempts to access a data processing system, the method comprising the computer implemented steps of:

responsive to a request to check for unauthorized attempts, monitoring a file used to contain data on failed attempts to access the data processing system; and responsive to the file containing data on failed attempts to access the data processing system, analyzing the data to identify candidates for unauthorized access attempts.

12. A method for identifying unauthorized access attempts to a data processing system, the method comprising the computer implemented steps of:

recording data in a file each time an attempt to access the data processing system has failed;

monitoring said file used to contain said data on failed attempts to access the data processing system;

responsive to said file containing said data on failed attempts to access the data processing system, analyzing said data to identify user IDs and hosts from which failed authorized attempts occurred; and responsive to a user ID having an absence of a successful access attempt, placing the user ID and an associated host in a notification file.

13. The method of claim 12 further comprising:

sending the notification file to a destination.

14. The method of claim 13, wherein the destination is identified by an email address.

15. A method for identifying unauthorized access attempts to a data processing system, the method comprising the computer implemented steps of:

periodically checking a file for data for a presence of failed attempts to access the data processing system within the file;

responsive to the file containing data on failed attempts to access the data processing system; analyzing the data to identify user IDs and hosts from which failed authorized attempts occurred; and responsive to a user ID having an absence of a successful access attempt, placing the user ID and an associated host in a notification file.

16. The method of claim 15 further comprising:

responsive to the presence of data within the file, storing the data for analysis; and removing the data from the file.

17. The method of claim 16, wherein the step of removing the data comprises replacing the file with a new file, which is empty.

18. A distributed data processing system comprising:

a network;

a plurality of clients connected to the network;

a server connected to the network, wherein the server stores a set of data for unsuccessful access attempts, checks for a presence of unsuccessful access attempts in response to a periodic event, analyzes the set of data to identify candidates for unauthorized access attempts, and responsive to an identification of a candidate for unauthorized access, sends a notification containing information about the candidate.

19. The distributed data processing system of claim 18, wherein the set of data is a first set of data that includes a user ID and wherein the server stores a second set of data for access attempts that includes a user ID for each successful access attempt and compares the user ID associated with an unsuccessful attempt with user IDs in the second set of data to whether a successful access attempt has ever occurred using the user ID.

20. A data processing system for identifying unauthorized attempts to access a data processing system, the data processing system comprising:

recording means for recording data in a file each time an attempt to access the data processing system has failed;

monitoring means for monitoring said file used to contain said data on failed attempts to access the data processing system; and analyzing means, responsive to the file containing said data on failed attempts to access the data processing system, for analyzing the data to identify candidates for unauthorized access attempts.

21. The data processing system of claim 20 further comprising:

generating means for generating a list of candidates of unauthorized access attempts; and sending means for sending the list to a destination.

22. The data processing system of claim 21, wherein the destination is identified in an email address.

23. The data processing system of claim 21, wherein the destination is a data processing system for an information systems administrator.

24. The data processing system of claim 20, wherein the means of analyzing the data to identify candidates for unauthorized access attempts comprises:

first identifying means for identifying hosts from which failed access attempts occurred;

second identifying means for identifying user identifications for the failed access attempts;

determining means for determining whether a successful access attempts have occurred for the user identifications for the hosts; and placing means, responsive to an absence of a successful access attempt for a user identification from a host, for placing the host in a list.

25. The data processing system of claim 20, wherein the means of analyzing the data to identify candidates for unauthorized access attempts comprises:

first identifying means for identifying user identifications (user IDs) for the failed access attempts;

second identifying means for identifying a number of failed access attempts for each user ID;

determining means for determining, for each user ID, whether a number of failed access attempts for a user ID is greater than a threshold; and placing means, responsive to the number being greater than the threshold, for placing the user ID in a list.

26. The data processing system of claim 20, wherein the monitoring means occurs in response to an event.

27. The data processing system of claim 20, wherein the method is performed in the data processing system.

28. The data processing system of claim 20, wherein the method is performed at another data processing system remote to the data processing system.

29. A data processing system for identifying unauthorized attempts to access a data processing system, the data processing system comprising:

monitoring means for monitoring, responsive to a periodic event, a file used to contain data on failed attempts to access the data processing system; and analyzing means, responsive to the file containing data on failed attempts to access the data processing system, for analyzing the data to identify candidates for unauthorized access attempts.

30. A data processing system for identifying unauthorized attempts to access a data processing system, the data processing system comprising:

monitoring means for monitoring, responsive to a request to check for unauthorized attempts, a file used to contain data on failed attempts to access the data processing system; and analyzing means, responsive to the file containing data on failed attempts to access the data processing system, for analyzing the data to identify candidates for unauthorized access attempts.

31. A data processing system for identifying unauthorized access attempts to a data processing system, the data processing system comprising:

recording means for recording data in a file each time an attempt to access the data processing system has failed;

monitoring means for monitoring said file used to contain said data on failed attempts to access the data processing system;

analyzing means, responsive to said file containing said data on failed attempts to access the data processing system, for analyzing said data to identify user IDs and hosts from which failed authorized attempts occurred; and placing means, responsive to a user ID having an absence of a successful access attempt, for placing the user ID and an associated host in a file.

32. The data processing system of claim 31, further comprising:

sending means for sending the notification file to a destination.

33. The data processing system of claim 32, wherein the destination is identified by an email address.

34. A data processing system for identifying unauthorized access attempts to a data processing system, the data processing system comprising:

monitoring means for periodically checking a file for data for a presence of failed access attempts within the file;

analyzing means, responsive to the file containing data on failed access attempts, for analyzing the data to identify user IDs and hosts from which failed authorized attempts occurred; and placing means, responsive to a user ID having an absence of a successful access attempt, for placing the user ID and an associated host in a file.

35. The data processing system of claim 34, further comprising:

storing means, responsive to a presence of data within the file, for storing the data for analysis; and removing means for removing the data from the file.

36. The data processing system of claim 35, wherein the means of removing the data comprises replacing the file with a new file, which is empty.

37. A computer program product in a computer readable medium for identifying unauthorized attempts to access a data processing system, the computer program product comprising:

first instructions for recording data in a file each time an attempt to access the data processing system has failed;

second instructions for monitoring said file used to contain said data on failed attempts to access the data processing system; and third instructions, responsive to said file containing said data on failed attempts to access the data processing system, for analyzing the data to identify candidates for unauthorized access attempts.

38. A computer program product in a computer readable medium for identifying unauthorized access attempts to a data processing system, the computer program product comprising:

first instructions for recording data in a file each time an attempt to access the data processing system has failed;

second instructions for monitoring said file used to contain said data on failed attempts to access the data processing system;

third instructions, responsive to said file containing said data on failed attempts to access the data processing system, for analyzing said data to identify user IDs and hosts from which failed authorized attempts occurred; and fourth instructions, responsive to a user ID having an absence of a successful access attempt, for placing the user ID and an associated host in a file.

39. A distributed data processing system comprising:

a network;

a plurality of clients connected to the network;

a server connected to the network, wherein the server stores a set of data for unsuccessful access attempts, checks for a presence of unsuccessful access attempts in response to a request to check for unauthorized attempts, analyzes the set of data to identify candidates for unauthorized access attempts, and responsive to an identification of a candidate for unauthorized access, sends a notification containing information about the candidate.

* * * * *